United States Patent
Hosoya

(10) Patent No.: US 7,086,695 B2
(45) Date of Patent: Aug. 8, 2006

(54) CHILD SEAT

(75) Inventor: Miho Hosoya, Saitama (JP)

(73) Assignee: Combi Corporation, Tokyo (JP)

( * ) Notice: Subject to any disclaimer, the term of this patent is extended or adjusted under 35 U.S.C. 154(b) by 0 days.

(21) Appl. No.: 10/877,993

(22) Filed: Jun. 29, 2004

(65) Prior Publication Data

US 2004/0262966 A1 Dec. 30, 2004

(30) Foreign Application Priority Data

Jun. 30, 2003 (JP) .............................. 2003-187451

(51) Int. Cl.
*B60N 2/28* (2006.01)

(52) U.S. Cl. .......................... 297/256.16; 297/256.13; 297/216.11

(58) Field of Classification Search .......... 297/216.11, 297/256.13, 256.16, 255
See application file for complete search history.

(56) References Cited

U.S. PATENT DOCUMENTS

| | | | | | |
|---|---|---|---|---|---|
| 5,494,331 | A | * | 2/1996 | Onishi et al. | 297/256.13 |
| 6,568,755 | B1 | * | 5/2003 | Groening | 297/256.13 |
| 6,739,661 | B1 | * | 5/2004 | Dukes | 297/256.13 |
| 6,746,080 | B1 | * | 6/2004 | Tsugimatsu et al. | 297/256.13 |

FOREIGN PATENT DOCUMENTS

EP 640508 A1 * 3/1995
FR 2596338 A1 * 10/1987

* cited by examiner

*Primary Examiner*—Anthony D. Barfield
(74) *Attorney, Agent, or Firm*—Young & Thompson

(57) ABSTRACT

In a child seat comprising a base unit placed on a seat of a vehicle and a seat unit placed on the base unit in a forward attitude with respect to the seat of the vehicle, the base unit is provided with a base body to be fixed to the seat, a slider connected to the base body in a positionally adjustable manner in a longitudinal direction of the seat of the vehicle, and a restraining belt device for restraining a child sitting on the seat unit, and the seat unit is provided with a seat cushion integrally connected to the slider in a positionally adjustable and detachable manner, and a seat back connected to the rear end of the seat cushion in a manner turnable about an axis extending in a lateral direction of the seat and connected on the back side thereof to the base unit in a detachable manner.

10 Claims, 15 Drawing Sheets

CHILD SEAT

BACKGROUND OF THE INVENTION

1. Field of the Invention

The present invention relates to a child seat, in which a seat unit is placed on a base unit to be fixed to a seat of a vehicle in a reclinable manner.

2. Description of the Related Art

Several classes are defined in a child seat according to the weight of a child (including an infant). For example, in conformity with ECE R44/03 applied in Europe, child seats for children within a range from about nine months or elder to about twelve years old or younger are classified into three classes according to weights: G1 (9 kg to 18 kg), G2 (15 kg to 25 kg) and G3 (22 kg to 36 kg). In addition to these classes, a G0 class is provided for a child of 0 to 18 months or having a weight of about 3 kg to about 13 kg. The child seats are variously configured according to the classes. For example, as for a sitting attitude, a baby cannot sit forward on a seat of a vehicle in a baby seat of the G0 class; a child can sit forward on a child seat of the G1 class; and a child can sit only forward in child seats of the G2 and G3 classes. From the viewpoint of a restraining manner of a baby or a child, the baby or the child is restrained on a seat unit by using a special restraining belt in the child seats of the G0 and G1 classes; and the child is restrained by using a seat belt of the vehicle in the child seats of the G2 and G3 classes. In addition, there are various differences according to the classes.

However, a burden is exerted on a user to buy the baby seat and the child seats according to the classes. Furthermore, a product may be discarded with wastage irrespective of the sufficient remainder of the lifetime of the product. In view of this, there has been proposed a child seat which can be used in any of a plurality of classes by changing usage modes.

There has been proposed a child seat which can be used in both of, for example, the G0 and G1 classes, the child seat comprising a base unit fixable to a seat of a vehicle by using a seat belt of the vehicle or a special fixing tool and a seat unit fixed onto the base unit in a manner turnable about a turning axis in a vertical direction. In the child seat of this type, a baby is restrained by a special restraining belt in a laying attitude by setting the seat unit rearward at the time of use as a seat of the G0 class; in contrast, a child is restrained in a sitting attitude by a restraining belt by setting the seat unit forward at the time of use as a seat of the G1 class.

Alternatively, there has been proposed an auxiliary child seat which does not have a restraining belt but is provided with a seat cushion portion and a seat back portion which can be detached from each other, wherein a child sitting position is corrected so as to be suited for a seat belt of a vehicle, or a seat belt of a vehicle is guided to be adapted to a child. In the child seat of this type, the seat cushion portion and the seat back portion are placed on a seat in combination at the time of use as a child seat of the G2 class; in contrast, the seat back portion is detached from the seat cushion portion, and then, only the seat cushion portion as a so-called booster is laid under a child at the time of use as a child seat of the G3 class. The above-described child seat has been developed to provide a child seat which can be used also as a child seat of the G1 class by disposing a shield in front of a child and restraining the shield by a shoulder belt portion of the vehicle. Although the seat of this type may be called a junior seat, it is included in modes of the child seat in the present specification.

The conventional child seat to be used commonly in the G0 class and the G1 class has a shell structure in which a seat unit is formed by integrating a seat cushion and a seat back with each other. Moreover, since a child is restrained by a restraining belt dedicated to a child, a cabin in the child seat is liable to be small for a well-built child, and therefore, the above-described child seat cannot cope with the child seats of the G2 class or more. Additionally, since the seat unit is configured in the shell structure, the inclination angle of the seat back with respect to the seat cushion is not varied even if the seat unit is reclined with respect to the base unit. Consequently, when the seat back is reclined in a horizontal direction, the seat cushion is inclined up forward, and as a result, the child may be forced to sprawl his or her legs upward in an unnatural attitude.

In the meantime, in a child seat in which a child is restrained by using a seat belt of a vehicle, a cabin can be largely secured. Since a seat back is turned with respect to a seat cushion, the inclination of the seat cushion is not varied even if the angle of the seat back is adjusted in accordance with an appropriate value, and therefore, a child sitting on a seat cannot be forced to take an unnatural attitude. However, a relatively large shield is placed in front of a child at the time of use as a child seat of the G1 class, thereby degrading conformability in comparison with the case of the use of the special restraining belt.

SUMMARY OF THE INVENTION

The present invention has been accomplished to solve the above-described problems experienced in the prior art. Therefore, an object of the present invention is to provide a child seat excellent in conformability, which cannot force a baby or a child to take an unnatural attitude in a wide range of application to children of various builds.

The above-described problems are solved by a child seat according to the present invention comprising a base unit placed on a seat of a vehicle, and a seat unit placed on the base unit in a forward attitude with respect to the seat of the vehicle, wherein the base unit is provided with a base body to be fixed to the seat, a slider connected to the base body in a positionally adjustable manner in a longitudinal direction of the seat of the vehicle, and a restraining belt device for restraining a child sitting on the seat unit, and the seat unit is provided with a seat cushion portion integrally connected to the slider in a positionally adjustable and detachable manner, and a seat back portion connected to the rear end of the seat cushion portion in a manner turnable about an axis extending in a lateral direction of the seat and connected at the back side thereof to the base unit in a detachable manner.

In the child seat according to the present invention, the seat cushion portion and the seat back portion of the seat unit are disposed in the base unit, and further, a child sitting on the seat unit is restrained on the seat unit via the restraining belt device of the base unit, thereby securely restraining a child even the child is too small to be applied to a seat belt of a vehicle. In this case, since the special seat belt is used for restraining the child, the conformability for the child is excellent because a relatively large member such as a shield need not be disposed in front of the child. The position of the seat cushion portion can be varied by moving the slider of the base unit in the longitudinal direction, and further, a desired sitting attitude can be achieved by varying the inclination of the seat back portion. At this time, since the seat back portion is turned with respect to the seat cushion portion, the inclination of the seat cushion portion cannot be varied, and therefore, the child is not forced to take any unnatural attitude.

When a child is not so well built that the seat belt of the vehicle is not used as it is, although the restraining belt device of the base unit is too small with a cramp feeling, the seat unit is placed on the seat of the vehicle in detachment from the base unit, and then, the child is made to sit on the seat unit. Consequently, the sitting attitude of the child is corrected so as to be fitted to the seat belt of the vehicle, whereby the child can be properly restrained by the seat belt. In this case, since the seat back portion is turned with respect to the seat cushion portion, an appropriate inclination along the seat back of the seat of the vehicle can be applied to the seat back portion. Since the seat unit is not configured in a shell structure, in which the seat cushion portion and the seat back portion are integrated with each other, a sufficient cabin can be provided for the child.

Additionally, since the restraining belt device is disposed in the base unit, the restraining belt device is integrated with the base unit even when the base unit and the seat unit are detached from each other, and therefore, there is no fear that the restraining belt device is lost.

In the child seat according to the present invention, the seat cushion portion and the seat back portion in the seat unit may be detached from each other. Consequently, only the seat cushion portion as a so-called booster which is separated from the seat back portion is placed on the seat, so that the child seat can be used even for a well-built child, for whom the seat back portion is not suited.

In the child seat according to the present invention, a restraining belt guide for regulating a passing position of a seat belt of the vehicle may be disposed on each of both sides in a width direction of the seat cushion portion. In this manner, the restraining belt guide is disposed in the seat cushion portion, so that a position at which the seat belt of the vehicle is hooked can be corrected to a position suitable for the child sitting on the seat cushion portion.

In the child seat according to the present invention, the base body in the base unit may be provided with a fixing belt guide for stretching the seat belt of the vehicle along a predetermined path with respect to the base body, and a lock-off device for restraining the seat belt of the vehicle with respect to the base body. In this mode, the base unit can be restrained on the seat of the vehicle by utilizing the seat belt of the vehicle. Incidentally, the lock-off device nay be configured in any structure as long as looseness of the seat belt can be prevented by restraining the seat belt of the vehicle.

In the above-described mode, in which the base unit is fixed by utilizing the seat belt of the vehicle, further, a waist belt guide serving as the fixing belt guide for guiding a waist belt portion of the seat belt of the vehicle may be located at a position to be covered with the seat cushion portion disposed in the slider. The waist belt guide is located at such a position, so that the seat unit can be fixed to the seat through the waist belt portion of the vehicle at the reverse, i.e., the lower surface of the seat cushion portion which does not interfere with the child sitting on the seat unit. The waist belt portion is concealed between the seat cushion portion and the slider, thereby preventing any change of the waist belt portion caused by an external factor, so as to enhance the stability in fixing the base unit by using the seat belt of the vehicle.

In the child seat according to the present invention, the restraining belt device may be provided with a shoulder belt and a crotch belt connected to the shoulder belt, one end of the crotch belt may be fixed to the slider while the other end of the crotch belt maybe drawn forward of the seat cushion portion in a manner connectable to the shoulder belt. In this way the child restraining position by the crotch belt cannot be changed by fixing the crotch belt to the slider even if the seat cushion portion is moved together with the slider in the longitudinal direction, thereby eliminating any fear that the change in position of the crotch belt gives an unpleasant feeling to the child.

In the child seat according to the present invention, the base body may be provided with a bottom supporter disposed on the seat cushion portion on the seat of the vehicle and a back supporter extending upward from the rear end of the bottom supporter and abutting against the seat back on the seat of the vehicle, the slider may be connected to the bottom supporter in a positionally adjustable manner in the longitudinal direction and the seat back portion may be connected to the back supporter at the upper end on the back side. The bottom supporter and the back supporter are disposed in the base body in the above-described manner, thereby stably supporting the seat cushion portion and the seat back portion in the seat unit. Furthermore, the seat back portion may be connected to the back supporter in a manner rotatable about an axis extending in a lateral direction of the seat. In this case, the inclination of the seat back portion can be smoothly varied according to the adjustment of the lengthwise position of the seat cushion portion, thus achieving a desired sitting attitude.

BRIEF DESCRIPTION OF THE DRAWINGS

FIGS. 7A and 7B are views showing the configuration relating to the positional adjustment of the slider, wherein FIG. 7A is a perspective view showing the configuration of the upper portion of the slider, from which the seat cushion is detached, and FIG. 7B is a cross-sectional view taken along a line VIIb—VIIb of FIG. 7A;

DETAILED DESCRIPTION OF THE PREFERRED EMBODIMENTS

Figure 1:
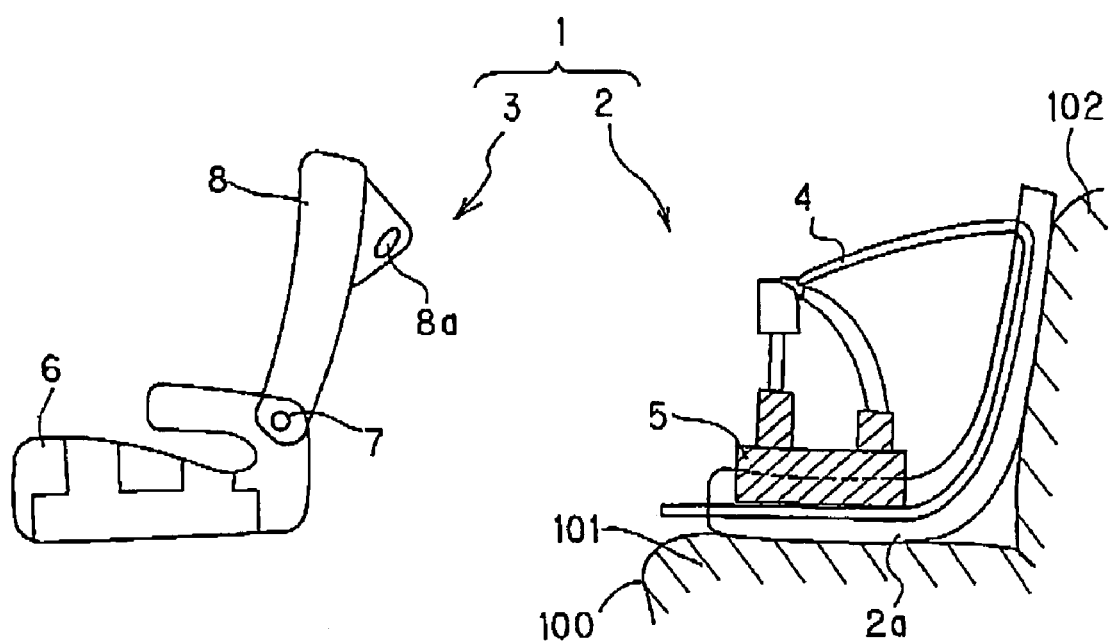
FIG. 1 is a view showing the basic configuration of a child seat in an embodiment according to the present invention.

First of all, the outline of a child seat in an embodiment according to the present invention will be explained in reference to FIGS. 1 to 3. As shown in FIG. 1, a child seat 1 comprises a base unit 2 and a seat unit 3 to be detachably attached onto the base unit 2. The base unit 2 is fixed by using a seat belt of a vehicle so as to be brought into contact with each of a seat cushion 101 and a seat back 102 of a seat 100 of the vehicle. Here, the base unit 2 may be fixed to the seat 100 by using a fixing device other than the seat belt of the vehicle such as a fixing device in conformity with, for example, an ISOFIX system.

The base unit 2 includes a base body 2a to be fixed to the seat 100, a restraining belt device 4 for restraining a child (a child), and a slider 5 which can be positionally adjusted with respect to the base body 2a in a longitudinal direction of the seat 100.

In the meantime, the seat unit 3 includes a seat cushion portion 6 to be connected integrally with respect to the slider 5 in a positionally adjustable and detachable manner, and a seat back portion 8 to be turnably connected to the rear end of the seat cushion portion 6 via a strut 7 extending in a lateral direction of the seat 100 and to be detachably connected at the back thereof to the base unit 2.

Figure 2A:
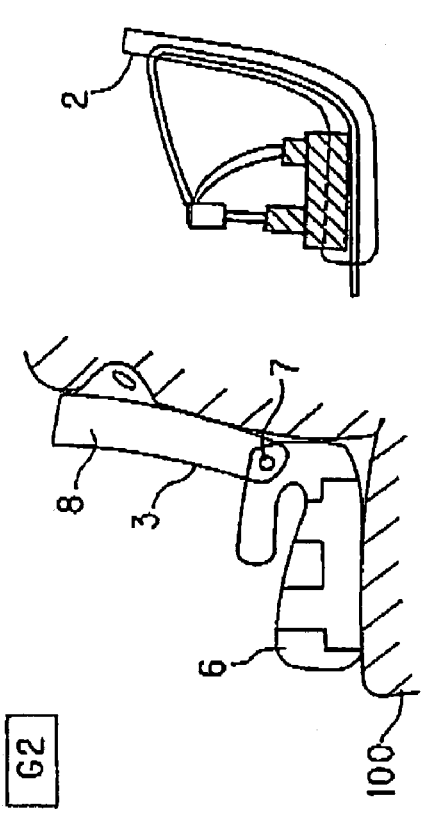
FIGS. 2A to 2C are views showing usage modes of the child seat shown in FIG. 1.
Figure 3A:
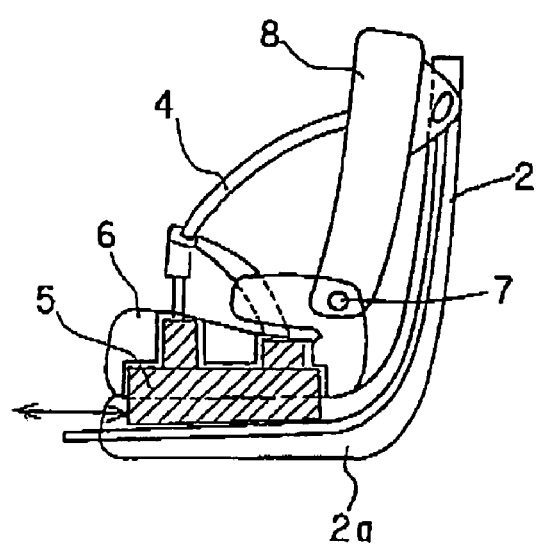
FIGS. 3A and 3B are views showing a mode in which the inclination of a seat back is varied in a state where a base unit and a seat unit are used in combination.
Figure 3B:
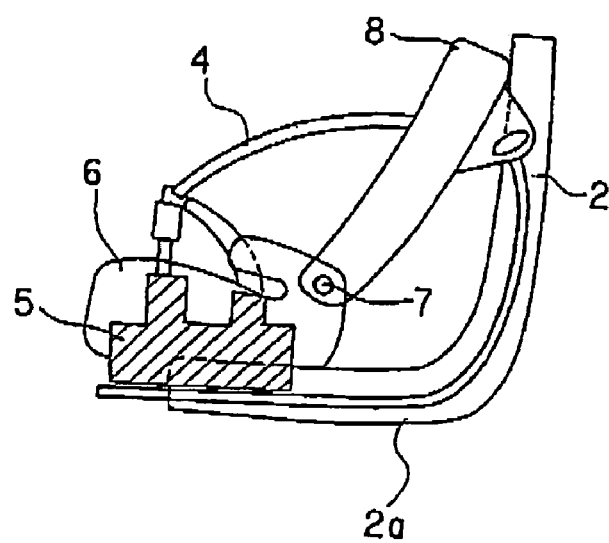

The child seat 1 such configured as described above can be adapted to all of G1 to G3 classes defined under the European standard (ECE R44/03) by varying the usage mode of the child seat 1. First, when using the child seat as the G1 class, the seat cushion portion 6 is placed on the slider 5, as shown in FIG. 2A, and then, a reclining shaft 9 parallel to the strut 7 in the base unit 2 is fitted into a slot 8a (see FIG. 1) formed at the back surface of the seat back portion 8, so that the seat unit 3 is attached to the base unit 2 in a forward attitude with respect to the seat 100. A child sitting on the seat unit 3 is fixed to the seat unit 3 by using the restraining belt device 4 disposed in the base unit 2. In this usage mode, as shown in FIGS. 3A and 3B, the seat back portion 8 can be turned on the strut 7 by moving the slider 5 back and forth together with the seat cushion portion 6, thereby varying the reclining angle of the seat back portion 8.

Figure 2B:
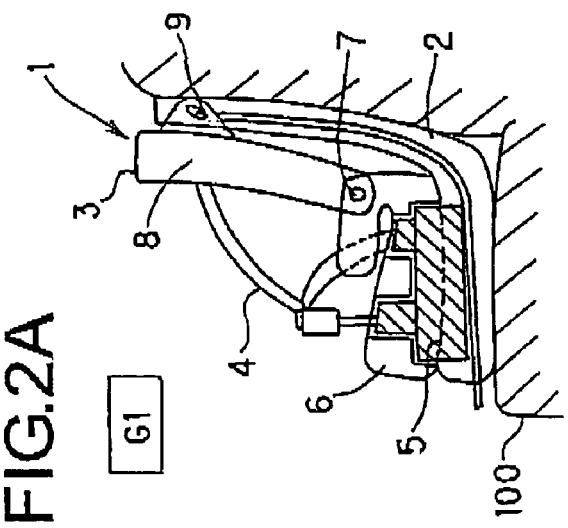
Figure 2C:
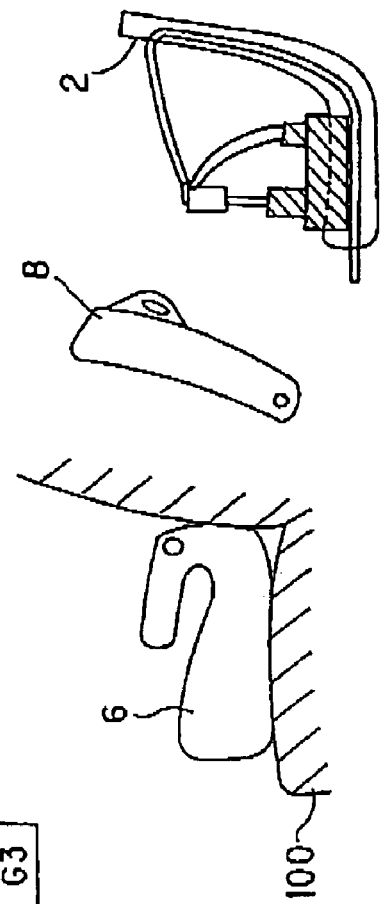

In the case of the use as a child seat of the G2 class, the seat unit 3 is detached from the base unit 2, and then, is placed on the seat 100 in a forward attitude, as shown in FIG. 2B. A child sitting on the seat unit 3 is fixed by using the seat belt of the vehicle. Subsequently, when using the child seat as the G3 class, the seat back portion 8 is detached from the seat cushion portion 6, and then, the seat cushion portion 6 is placed on the seat 100, as shown in FIG. 2C. A child sitting on the seat cushion portion 6 is fixed by using the seat belt of the vehicle.

In this manner, according to the child seat 1 in the present embodiment, since the child is restrained by the restraining belt device 4 in the base unit 2 when using the child seat as the G1 class, even a small child can be more appropriately restrained in comparison with the case where the small child is restrained by using the seat belt of the vehicle. Since a relatively large structure such as a shield need not be disposed in front of the child, the child seat 1 is excellent in conformability. Since the inclination of the seat cushion portion 6 is not varied when the seat back portion 8 is reclined, the child is not forced to take an unnatural reclining attitude. Moreover, the child is restrained by using the seat belt of the vehicle when using the child seat as the G2 class. Since the seat unit 3 is not configured in a shell structure, a sufficient cabin can be secured. Additionally, the child seat 1 can be applied to the child seat of the G3 class, in which only the seat cushion portion 6 is used. As a consequence, there is produced an advantage that the single child seat 1 can be adapted to any one of the children of various builds.

Subsequently, a child seat 1 in a more specific embodiment will be described in reference to FIGS. 4 to 17. Here, the essential parts in the child seat 1 shown in FIGS. 1 to 3 are designated by the same reference numerals in FIGS. 4 to 17.

Figure 4:
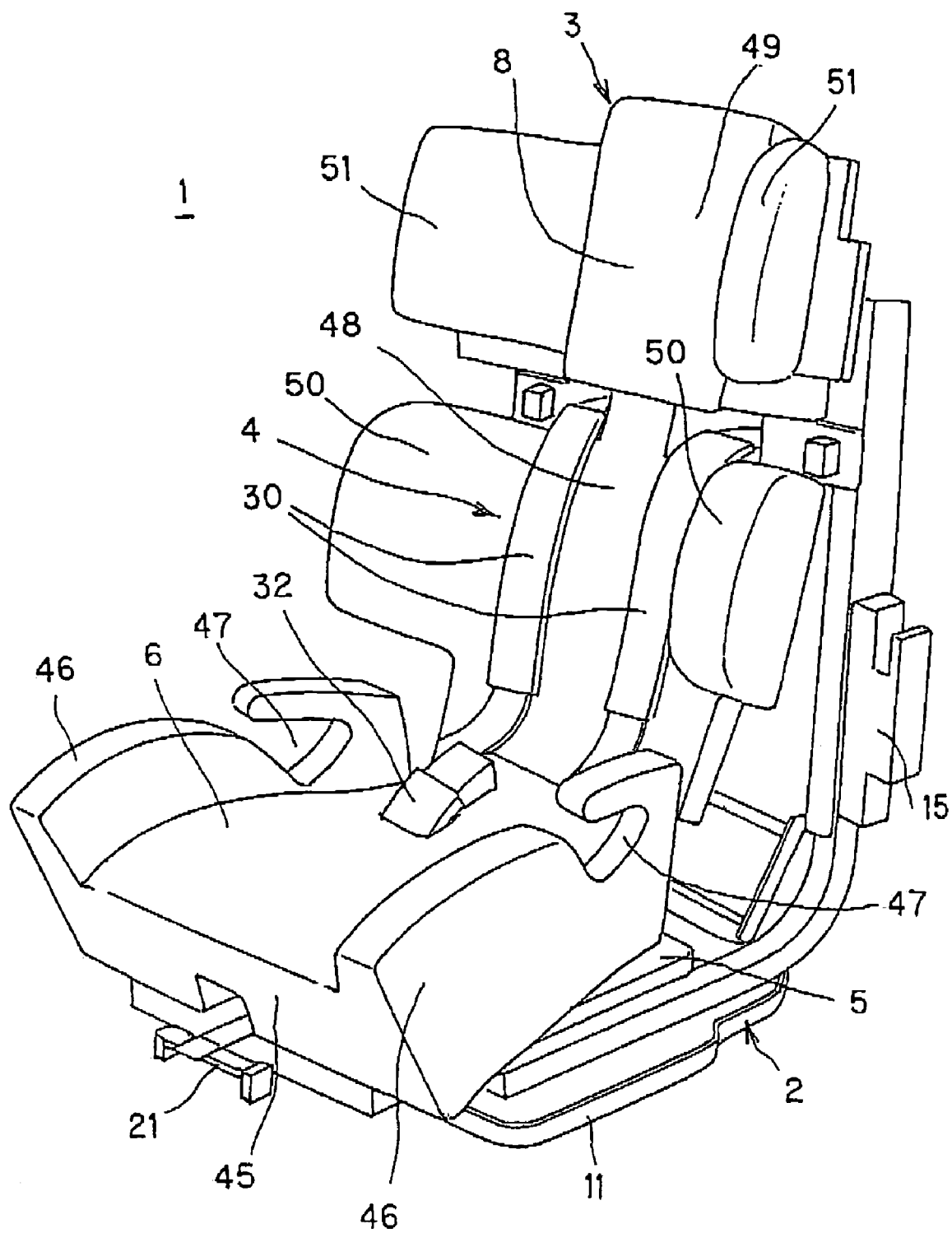
FIG. 4 is a perspective view showing a specific configuration of the child seat in the embodiment according to the present invention.

FIG. 4 is a perspective view showing the outline of the child seat 1. As described above, the child seat 1 comprises a base unit 2 and a seat unit 3 to be detachably attached to the base unit 2. The base unit 2 includes a restraining belt device 4.

Figure 5:
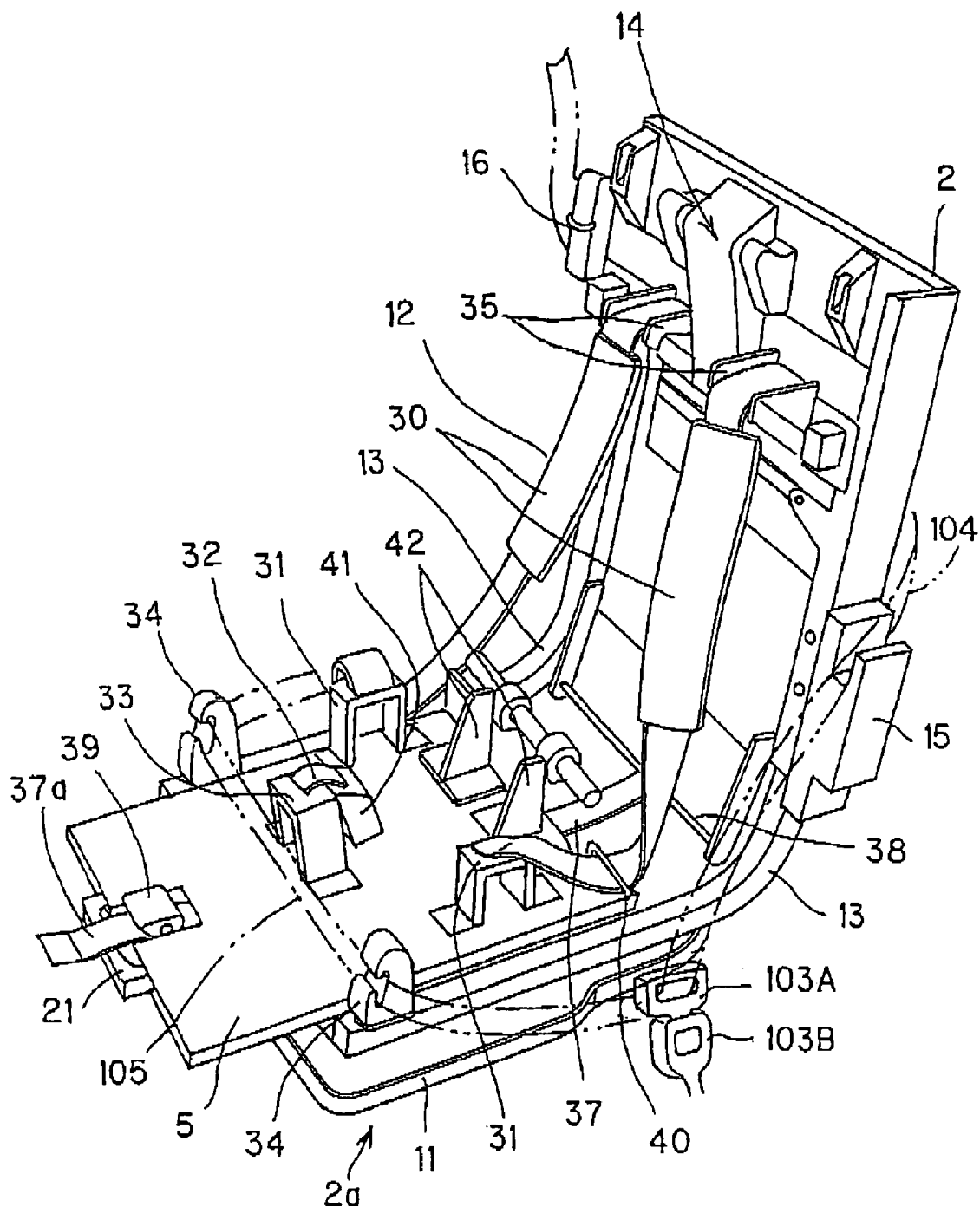
FIG. 5 is a perspective view showing the details of the base unit in a state where the seat unit shown in FIG. 4 is detached.

FIG. 5 is a view showing the details of the base unit 2, from which the seat unit 3 is detached. The base unit 2 includes a base body 2a. The base unit 2 is provided with a support base 11 serving as a supporter on a bottom side, and a back frame 12 serving as a supporter on a back side and extending upward from the rear end of the support base 11. The back frame 12 is provided with a pair of main frames 13 erected rearward from both sides of the support base 11, and a connecting portion 14 interposed between the pair of main frames 13.

A fixing belt guide (hereinafter simply referred to as "a belt guide") 15 and a lock off device 16 serving as a restraining device are attached to each of the pair of main frames 13. In FIG. 5, there are shown only the fixing belt guide 15 attached to one of the main frames 13 and only the lock-off device 16 attached to the other main frame 13. The belt guide 15 is adapted to guide a shoulder belt portion 104 of a seat belt of a vehicle to the back side of the frame 12 when the base unit 2 is fixed to a seat 100 (see FIG. 1) by fitting a tongue 103A, through which the shoulder belt portion 104 is passed, to a buckle 103B. The lock-off device 16 is a well-known device for fixing the shoulder belt portion 104 to the base unit 2 by holding the shoulder belt portion 104 guided to the back side of the frame 12 between a pair of pawls.

The shoulder belt portion 104 stretched between an anchor, not shown, of the vehicle and a fixing position by the buckle 103B is guided to the back side of the back frame 12 along the belt guide 15 attached to one of the main frames 13 in the base unit 2, to be thus held by the lock-off device 16 disposed in the main frame 13 on the other side. Consequently, a belt length from an anchor of a waist belt portion 105 to the lock-off device 16 is set to a constant value, so that the base unit 2 is fixed to the seat 100. The shoulder belt portion 104 is not stretched across the fore side of the base unit 2 so as to avoid any interference of the shoulder belt portion 104 with shoulder belts 30 of the restraining belt device 4. Incidentally, when the relationship between the child seat 1 and the shoulder belt portion 104 in a drawing direction may be reverse on the right and left, the fixing positions of the belt guide 15 and the lock-off device 16 can be changed to the same height position of the main frames 13 on the opposite sides, respectively.

Figure 6:
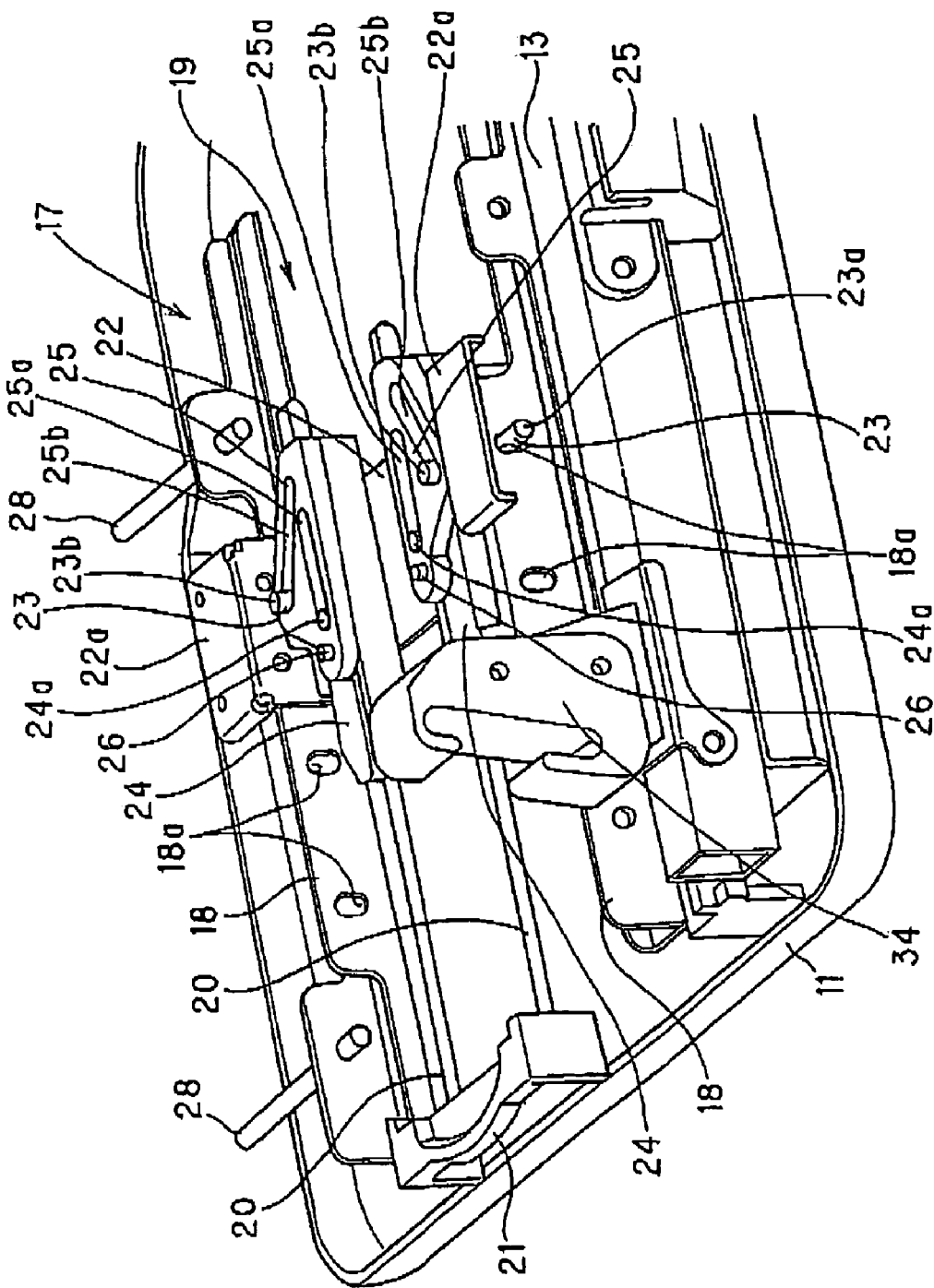
FIG. 6 is a perspective view showing the details of a position adjusting mechanism for connecting a base body and a slider to each other, shown in FIG. 4.

The slider 5 in the base unit 2 is connected to the upper surface side of the support base 11 in the base body 2a in a positionally adjustable manner in a longitudinal direction via a position adjusting mechanism 17 shown in FIG. 6. Here, FIG. 6 shows a state of the position adjusting mechanism 17 in detail, in which the slider 5 is detached from the base unit 2. The position adjusting mechanism 17 includes a pair of rails 18 which are disposed in the support base 11 and extend in the longitudinal direction, a lock unit 19 interposed between the pair of rails 18, a pair of rods 20 extending forward of the lock unit 19, and a position adjusting lever 21 secured at the tips of the rods 20. The lock unit 19 is provided with a base plate 22 which can move back and forth along and between the rails 18. At the upper surfaces of slider receivers 22a at both ends of the base plate 22 is secured the slider 5. Under each slider receiver 22a is disposed a lock pin 23. A tip portion 23a of each lock pin 23 is alternatively inserted into anyone of lock holes 18a . . . 18a formed at each of the rails 18, so that the slider 5 can be secured at any one of a plurality of positions with intervals in the longitudinal direction.

Lock pin driving cams 25 are disposed at the upper surface of the base plate 22 via cam bases 24. Each lock pin driving cam 25 is supported movably within a limited range in the longitudinal direction with respect to the cam base 24 by fitting a guide pin 24a of the cambase 24 into a guide groove 25a extending in the longitudinal direction. Moreover, in the lock pin driving cam 25 is formed a pin driving groove 25b inclined slantwise in the longitudinal direction so as to be away forward from the outside of the guide groove 25a. To the pin driving groove 25b is fitted a base portion 23b of the lock pin 23. Additionally, the lock pin driving cam 25 is connected to the rod 20 via a connecting pin 26, and further, is urged rearward by an urging mechanism, not shown. The urging mechanism can hold the lock pin driving cam 25 at a standby position at which the guide pin 24a abuts against the fore end of the guide groove 25a.

Figure 7A:
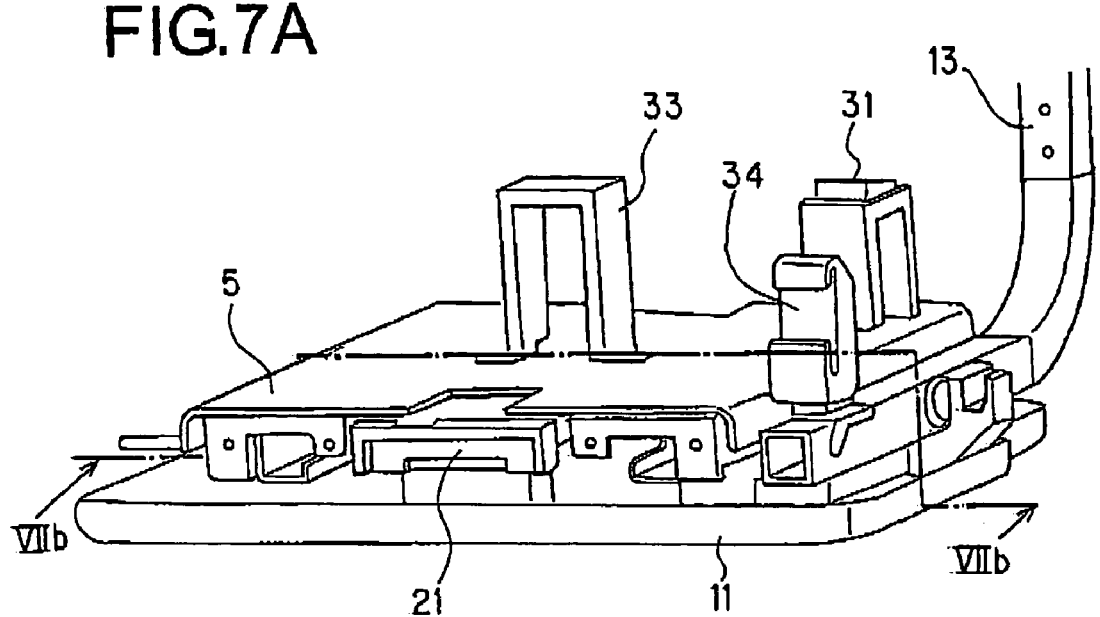
Figure 7B:
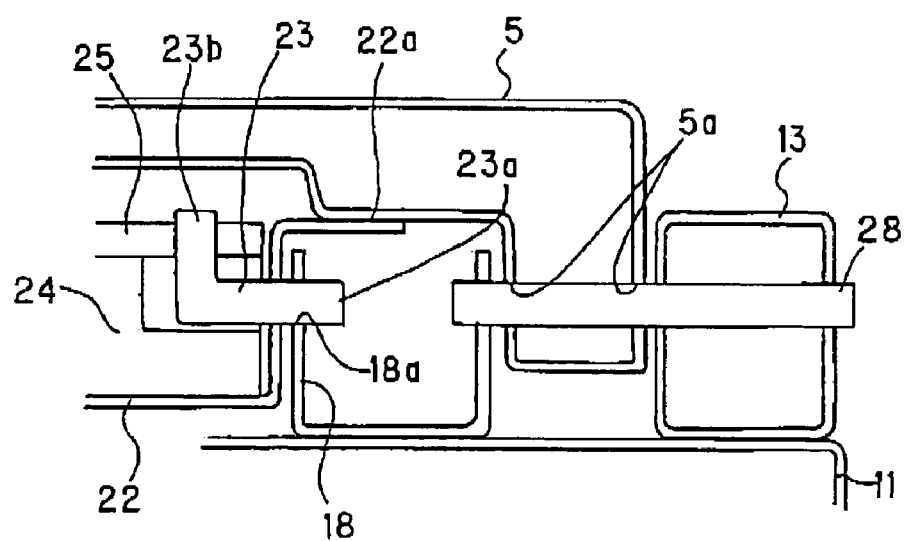

When the position adjusting lever 21 is pulled forward, the operation is transmitted to the lock pin driving cams 25 via the rods 20, and thus, the cams 25 advance with respect to the base plate 22. With the advance of the lock pin driving cams 25, the base portions 23b of the lock pins 23 are relatively moved toward the rear ends of the pin driving grooves 25b. According to the inclination of the pin driving grooves 25b, the lock pins 23 are drawn into the lock unit 19. As a result, the tip portions 23a of the lock pins 23 disengage from the lock holes 18a, so that the slider 5 can be moved back and forth with respect to the rails 18. Incidentally, as shown in FIGS. 7A and 7B, each rail 18 includes a plurality of slider connecting pins 28 projecting outward in a lateral direction. The slider connecting pin 28 is fitted into a longitudinal slot 5a formed on the slider 5. Consequently, the slider 5 can be prevented from being slipped off in a vertical direction while allowing the positional adjustment of the slider 5 in the longitudinal direction.

Returning to FIG. 5, at the upper surface of the slider 5 are disposed fixing portions 31 for the pair of shoulder belts 30 in the restraining belt device 4 and a fixing portion 33 for a crotch belt 2 in the restraining belt device 4. The fixing portions 31 and 33 project from the upper surface of the slider 5 so as to fix the belts 30 and 32, respectively, at substantially the same height as the seat level of the seat cushion portion 6 disposed in the slider 5.

As shown in FIG. 5, at the fore ends of the main frames 13 are disposed waist belt guides 34, for guiding the waist belt portion 105 of the vehicle, so as to project on both sides of the slider 5. The longitudinal position of each waist belt guide 34 is determined such that the waist belt portion 105 is away forward from the crotch belt fixing portion 33 even if the slider 5 is moved at the fore end within the movable range thereof. Therefore, the waist belt portion 105 is held between the base unit 2 and the seat cushion portion 6 and at a position nearer the fore end than the center in the longitudinal direction of the base unit 2 by the waist belt guides 34. As a consequence, it is possible to reduce an inclination angle with respect to a horizontal direction of the waist belt portion 105 extending from the anchor and the buckle 103B of the vehicle toward the base unit 2, so as to enhance the effect of the restraint of the base unit 2 in the longitudinal direction by the waist belt portion 105.

Each waist belt guide 34 is configured to hold the band-like waist belt portion 105 in an erecting attitude along the vertical direction, and in other words, to hold the band like waist belt portion 105 in an attitude in which the width direction of the waist belt portion 105 is oriented substantially in the vertical direction. Since the waist belt portion 105 is inserted into the waist belt guides 34 in the above-described attitude, the base body 2a of the base unit 2 can be firmly held by the waist belt portion 105 against a forward impact acceleration.

Figure 8:
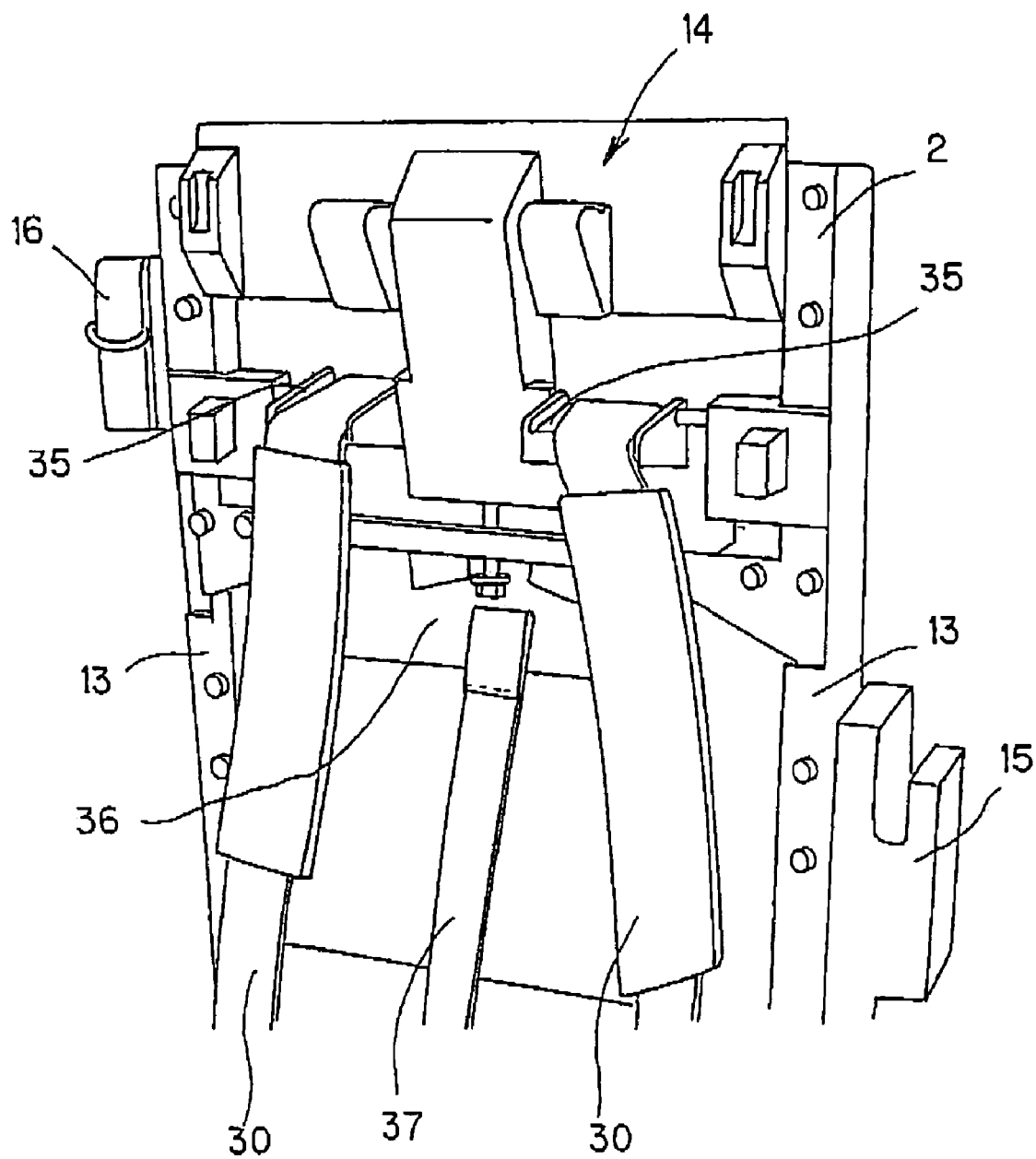
FIG. 8 is a view showing the upper portion of the base unit shown in FIG. 5, as viewed in another direction.
Figure 14:
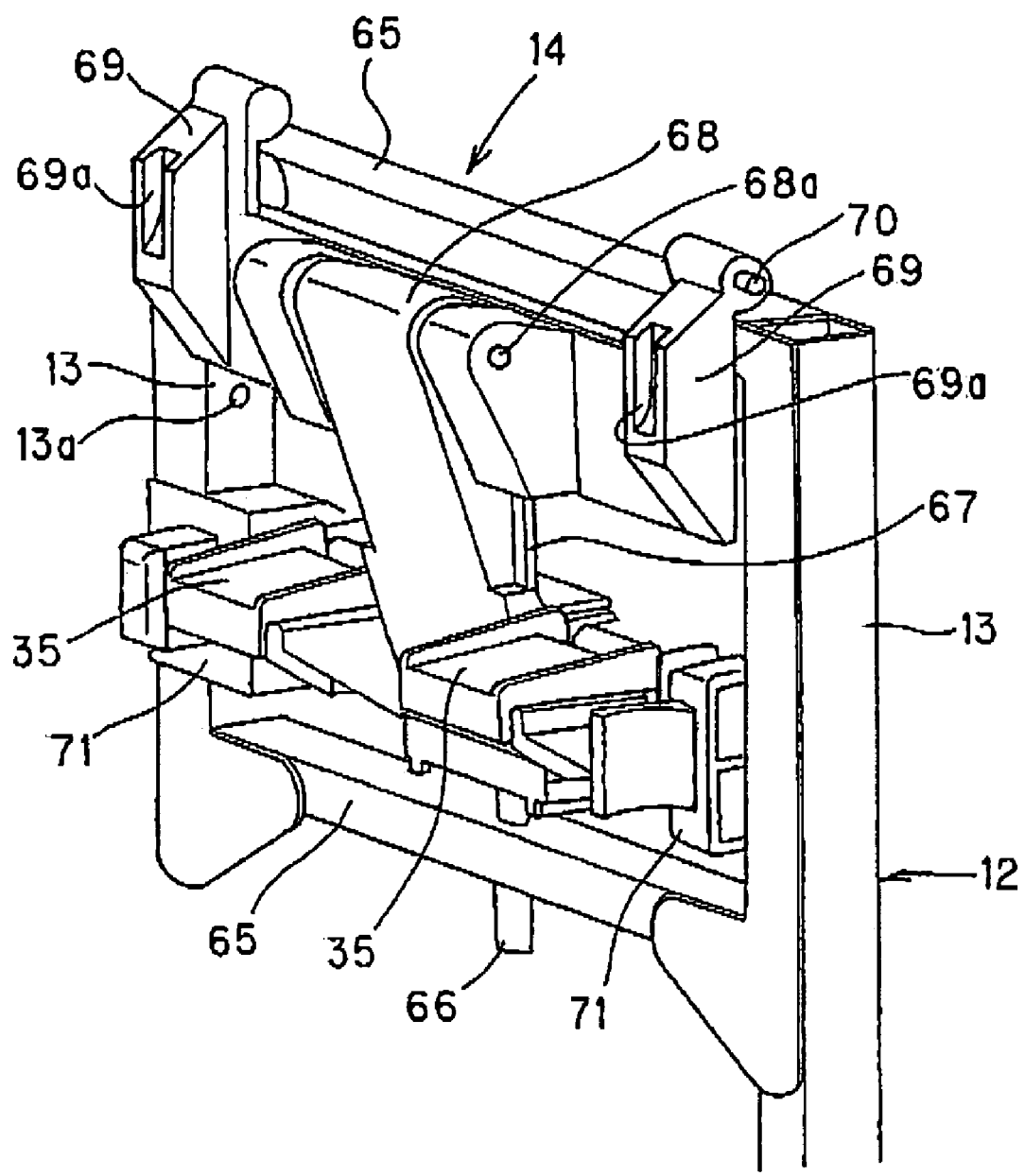
FIG. 14 is a view showing the configuration of a portion at which the seat cushion is connected to a back supporter in the base unit.

Under the connecting portion 14 for the frame 12 are disposed belt guides 35 for guiding the pair of shoulder belts 30 in the restraining belt device 4 (also see FIG. 14). As shown in FIG. 8, the shoulder belts 30 guided to the back side of the frame 12 via the belt guides 35 are connected to a single adjusting belt 37 via a connecting tool 36. As is clear from FIG. 5, the adjusting belt 37 is stretched around a connecting shaft 38 parallel to the strut 7 fixed between the lower ends of the main frames 13, to be thus guided between the support base 11 and the slider 5, and further, is pulled forward of the child seat 1 through a belt adjuster 39 disposed at the fore end of the slider 5. The belt adjuster 39 is a well-known belt length adjusting device for allowing the forward pulling operation of the adjusting belt 37 and inhibiting the adjusting belt 37 from being returned rearward unless a predetermined releasing operation is performed. A tongue 40 disposed in each shoulder belt 30 is secured to a buckle 41 at the tip of the crotch belt 32, and thereafter, a tip portion 37a of the adjusting belt 37 is drawn forward, so that the length of each shoulder belt 30 stretched between the fixing portion 31 and the belt guide 35 can be adjusted to a desired value. Moreover, bearing portion 42 for rotatably connecting the seat cushion portion 6 is disposed at the rear end of the slider 5.

Returning to FIG. 4, the seat cushion portion 6 has a cushion 45, on which a child (a child) sits, and side supports 46 disposed on both sides of the cushion 45. Restraining belt guides (hereinafter simply referred to as "belt guides") 47 for regulating the passing position of the waist belt portion 105 of the vehicle with respect to the seat cushion portion 6 are disposed on both sides at the rear end of the seat cushion portion 6 by cutting out the side supports 46. Incidentally, the belt guides 47 are not used in the usage mode of the G1 class, in which the base unit 2 is used. That is to say, the belt guides 47 are used in the usage mode of the G2 class, in which only the seat unit 3 is used, and in the usage mode of the G3 class, in which only the seat cushion portion 6 is used.

Further, the seat back portion 8 is equipped with a back rest 48 supporting the back of the child and a head rest 49 for supporting the head, and side supports 50 and 51 projecting sideways of the back rest 48 and the head rest 49, respectively. The shoulder belts 30 in the restraining belt device 4 are drawn forward of the seat unit 3 through clearances between the side supports 50 and 51.

Figure 9:
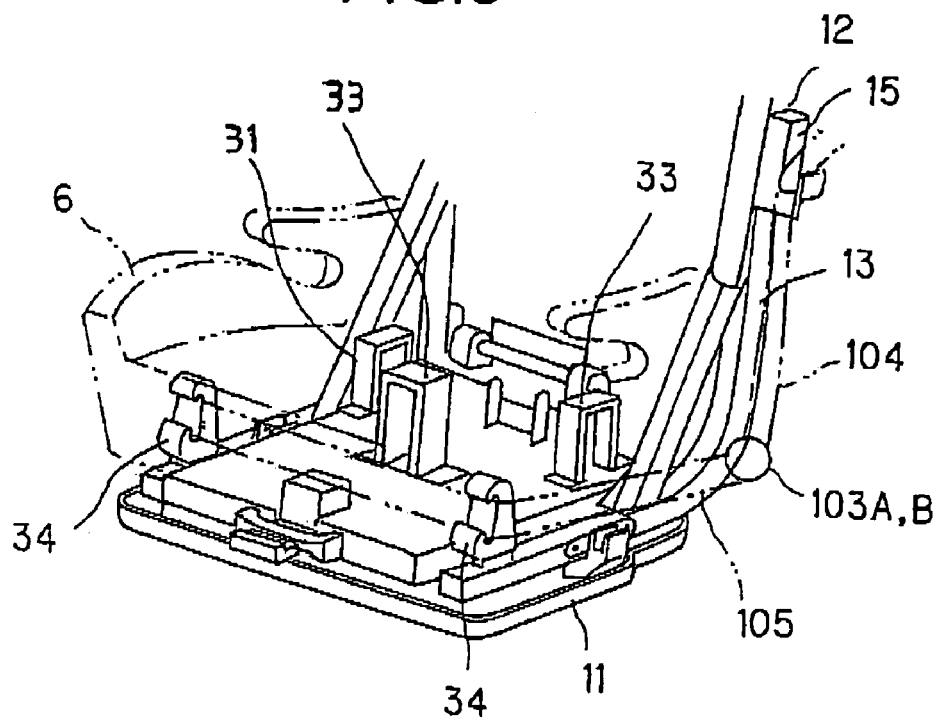
FIG. 9 is a view showing the schematic configuration of the upper portion of the base unit covered with the seat cushion shown in FIG. 4.
Figure 11:
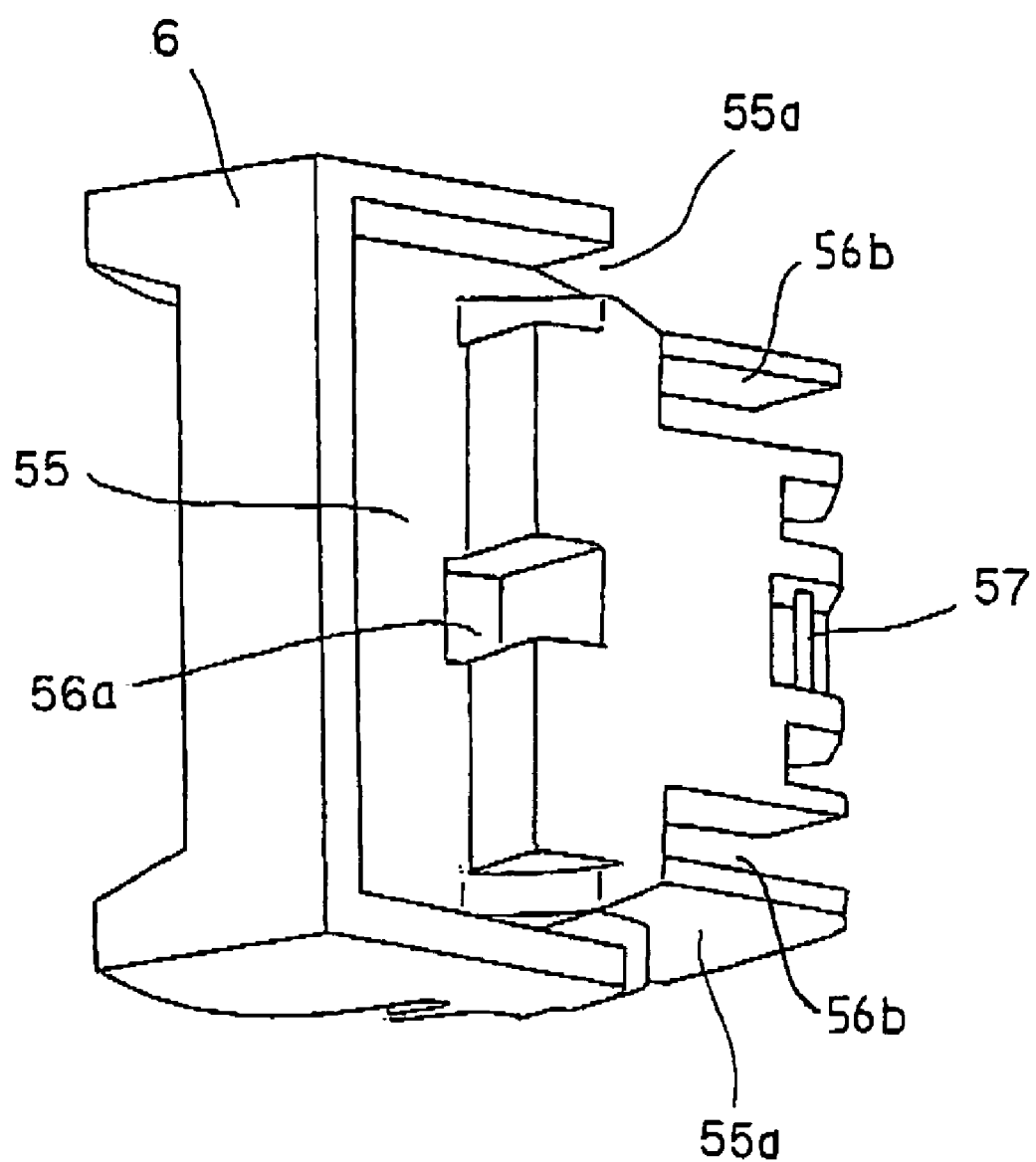
FIG. 11 is a view showing the configuration of the reversal portion of the seat cushion.

As shown in FIG. 9, all of the crotch belt fixing portions 33 and waist belt guides 34 disposed at the upper surface of the slider 5 and the waist belt portion 105 wound around the waist belt guides 34 are covered with the seat cushion portion 6 by putting the seat cushion portion 6 onto the slider 5. Thus, as shown in FIG. 11, a recess 55 for avoiding the interference of the waist belt guides 34 and the waist belt portion 105 stretched across the waist belt guides 34 with the seat cushion portion 6 is formed at the reverse side (i.e., the lower surface) of the seat cushion portion 6. The size and position of the recess 55 are determined so as to prevent any interfere of the seat cushion portion 6 with the waist belt portion 105 in all the region within a movable range of the slider 5. Openings 55a are formed on both sides at the rear end of the recess 55. The waist belt portion 105 extending from the waist belt guides 34 toward the anchor and the buckle 103B of the vehicle is drawn outside of the seat cushion portion 6 from the openings 55a.

A through hole 56a, through which the crotch belt 32 fixed to the fixing portion 33 and the buckle 41 are drawn to the upper surface side of the seat cushion portion 6, is formed at the seat cushion portion 6. Incidentally, one end of each shoulder belt 30 is secured to the fixing portion 31 while the other end is secured to the connecting tool 36, so that the shoulder belt 30 cannot be passed through the seat cushion portion 6 even if a through hole for the shoulder belt 30 is formed on the seat cushion portion 6. Consequently, as for the fixing portions 31 with respect to the shoulder belts 30, grooves 56b opened at the rear end of the seat cushion portion 6 are formed so as to allow the fixing portions 31 to pass through the seat cushion portion 6.

Figure 10:
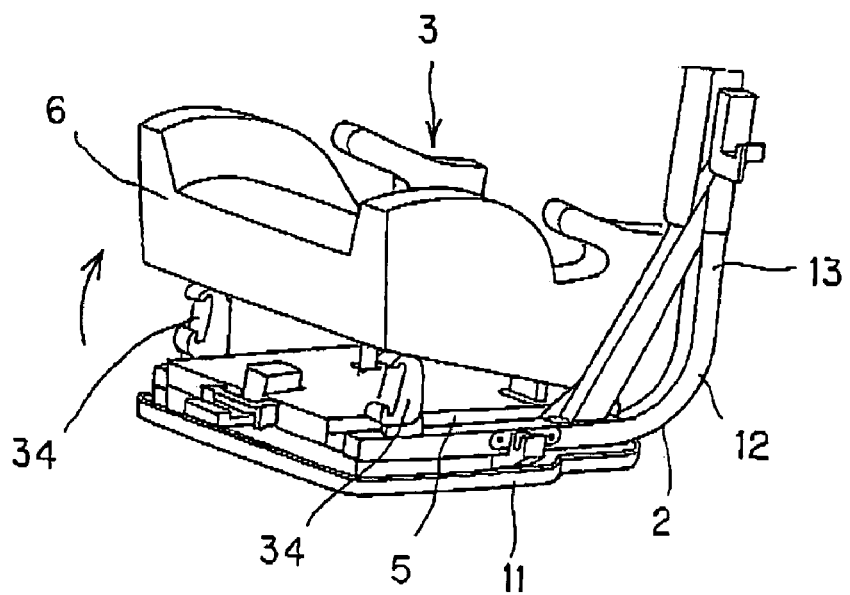
FIG. 10 is a view showing a state where the seat cushion is lifted up in the state shown in FIG. 9.

Moreover, a cushion rotary shaft 57 is disposed at the rear end of the seat cushion portion 6. The cushion rotary shaft 57 extends in the lateral direction of the seat 100, and thus, is rotatably supported on the axis by the bearing portion 42 shown in FIG. 5. Therefore, as shown in FIG. 10, the belt guides 34 can be exposed by lifting up the seat cushion portion 6 around the cushion rotary shaft 57. Here, in order to freely detach the seat cushion portion 6 from the slider 5, the cushion rotary shaft 57 can be detached from the bearing portion 42. The details of the connecting portion will be described below.

Figure 12:
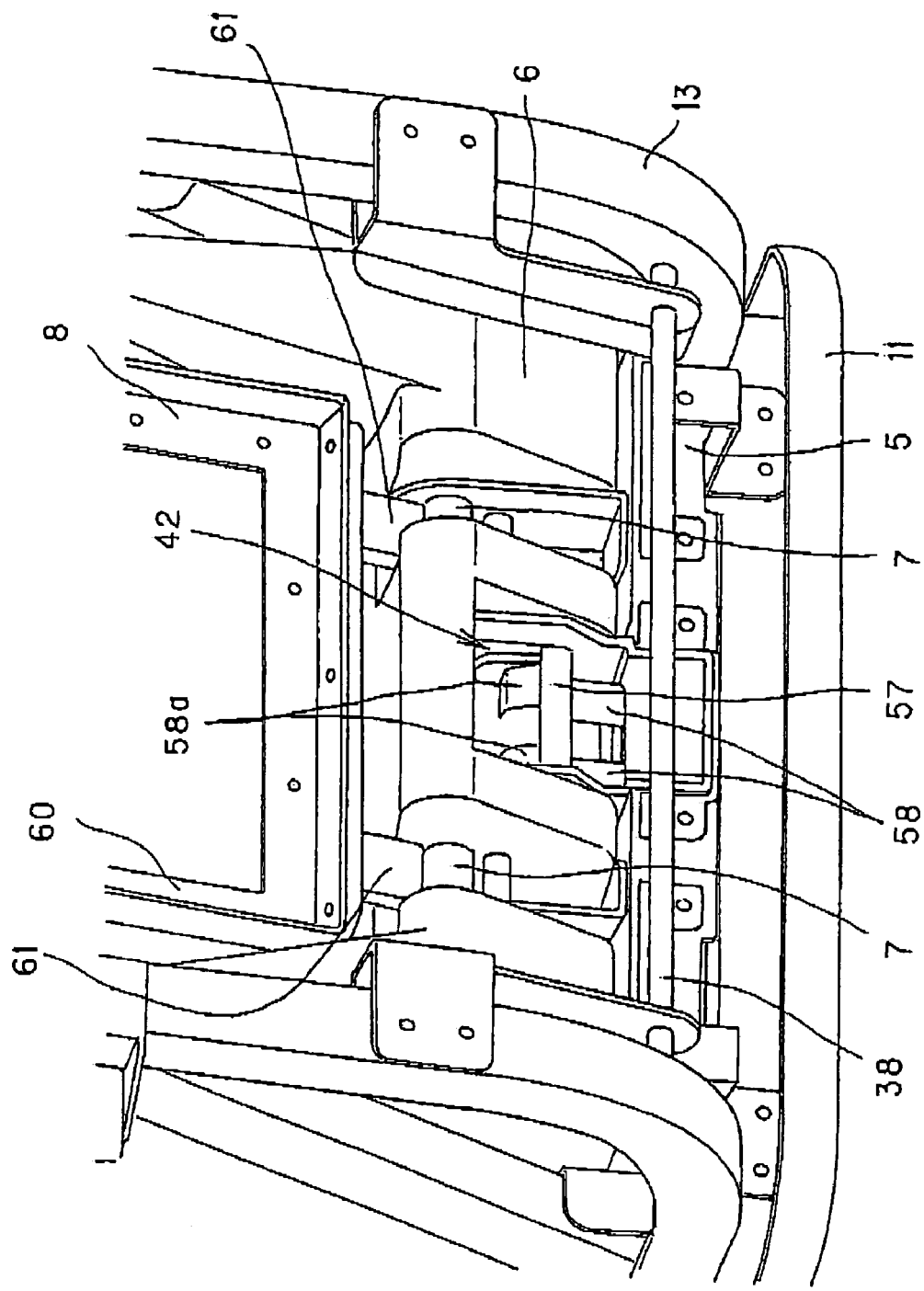
FIG. 12 is a view showing a portion at which the seat cushion and the seat back are connected to each other, as viewed from the back.

FIG. 12 shows the connecting portion between the seat cushion portion 6 and the seat back portion 8 in enlargement. As is obvious from FIG. 12, a pair of holding pawls 58 projecting upward of the slider 5 are disposed at the bearing portion 42 at the rear end of the slider 5. Hooks 58a formed at the upper ends of the holding pawls 58 engage with the cushion rotary shaft 57 by fitting the cushion rotary shaft 57 to the holding pawls 58 from the back surface of the base unit 2, thereby inhibiting any of forward and upward movements of the cushion rotary shaft 57. As a result, the seat cushion portion 6 is connected to the slider 5 in a state liftable around the cushion rotary shaft 57. When the seat cushion portion 6 is pushed rearward in the state where the fixing portions 31 and 33 (see FIG. 5) disengage from the seat cushion portion 6 with the seat cushion portion 6 lifted up, the cushion rotary shaft 57 is released from the bearing portion 42, so that the seat cushion portion 6 can be detached from the slider 5.

Figure 13:
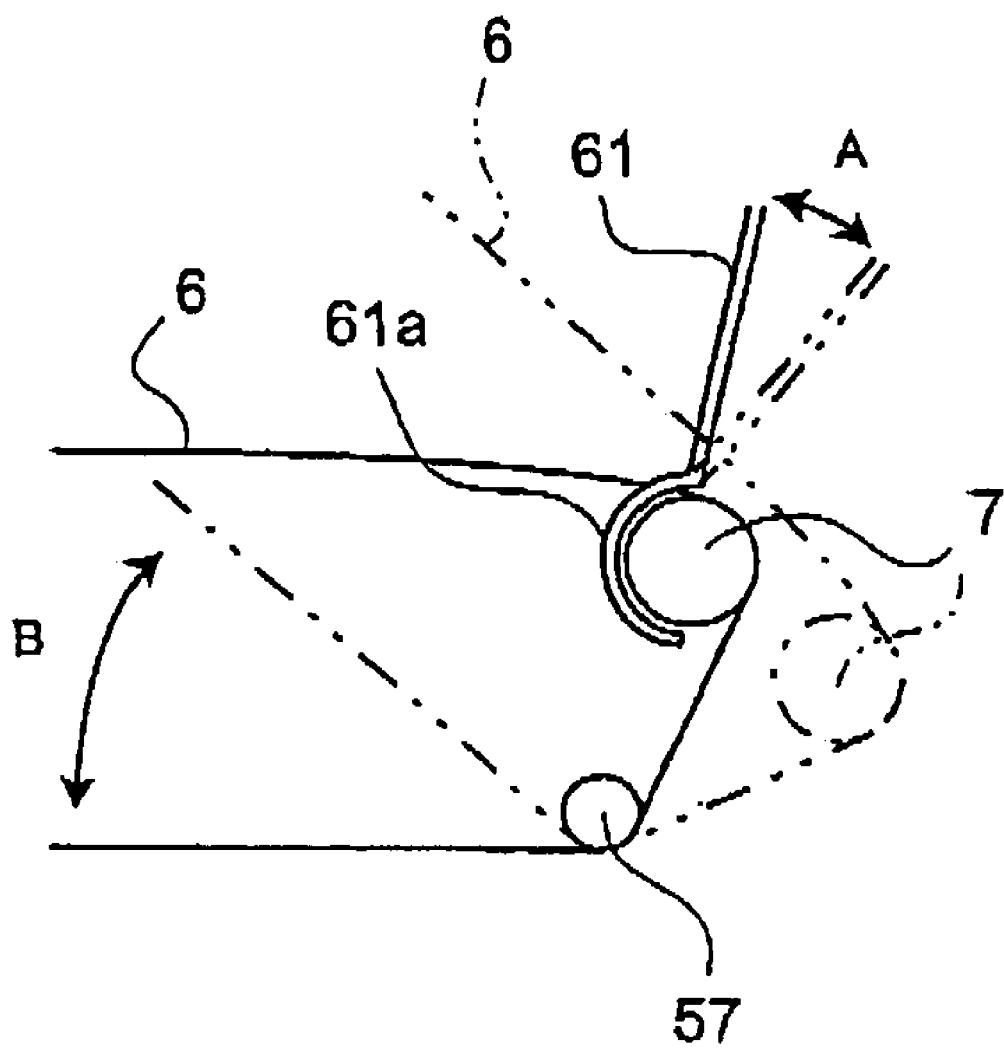
FIG. 13 is a view showing the relationship between operation for lifting up the seat cushion and operation for reclining the seat back with respect to the seat cushion.

Further, as shown in FIG. 12, the pair of struts 7 are disposed coaxially with each other at the rear end of the seat cushion portion 6. A frame 60 for securing the rigidity of the seat back portion 8 is disposed at the back surface of the seat back portion 8, and further, a pair of arms 61 engageable with the struts 7 are disposed at the lower end of the frame 60. As shown in FIG. 13, the arm 61 is provided with a semi-circular portion 61a fitted around substantially the fore half circumference of the strut 7. Consequently, the arm 61 is inserted forward of the strut 7, and thus, the semi-circular portion 61a engages with the strut 7, so that the seat back portion 8 can be rotatably connected on the strut 7 with respect to the seat cushion portion 6. As indicated by an arrow A in FIG. 13, the arm 61 is rotated on the strut 7, thereby changing the reclining angle of the seat back portion 8. Incidentally, as indicated by an arrow B in FIG. 13, when the seat cushion portion 6 is lifted up on the cushion rotary shaft 57, the strut 7 is away from the arm 61, and therefore, the strut 7 cannot interfere with the lifting-up operation of the seat cushion portion 6.

FIG. 14 shows the details of the connection portion 14 disposed on the back frame 12 in order to connect the seat back portion 8 to the base unit 2. The connection portion 14 includes a pair of cross bars 65 stretched between the main frames 13, a guide rod 66 extending vertically across the cross bars 65, and a vertically movable slider 67 under the guidance of the guide rod 66 and the main frames 13. At the center of the upper portion of the slider 67 is disposed a center supporter 68 projecting forward. On both sides of the center supporter 68 are formed pin inserting holes 68a (only either one of which is shown in FIG. 14). Auxiliary supporters 69 are formed besides the center supporter 68. A receiving groove 69a is formed at each of the auxiliary supporters 69. In addition, a guide pin 70 projecting outward in the lateral direction is formed at the upper portion of each of the auxiliary supporters 69.

In the meantime, slide guides 71 sliding along the main frames 13 are disposed at the lower portion of the slider 67. Moreover, the above-described belt guides 35 (see FIGS. 5 and 8) are disposed inward of the slide guides 71. In this way, the belt guides 35 are vertically moved integrally with the supporters 68 and 69. Consequently, it is possible to position all the time the belt guides 35 in a clearance formed between the side supports 50 and 51 in the seat back portion 8 connected to the slider 67, so as to prevent any change of the drawing position of the shoulder belts 30 with respect to the seat unit 3. Further, each slide guide 71 is selectively fitted into any one of the plurality of pin inserting holes 13a formed at the main frame 13. In this manner, the slider 67 can be selectively positioned at any one of a plurality of positions in the vertical direction.

Figure 15:
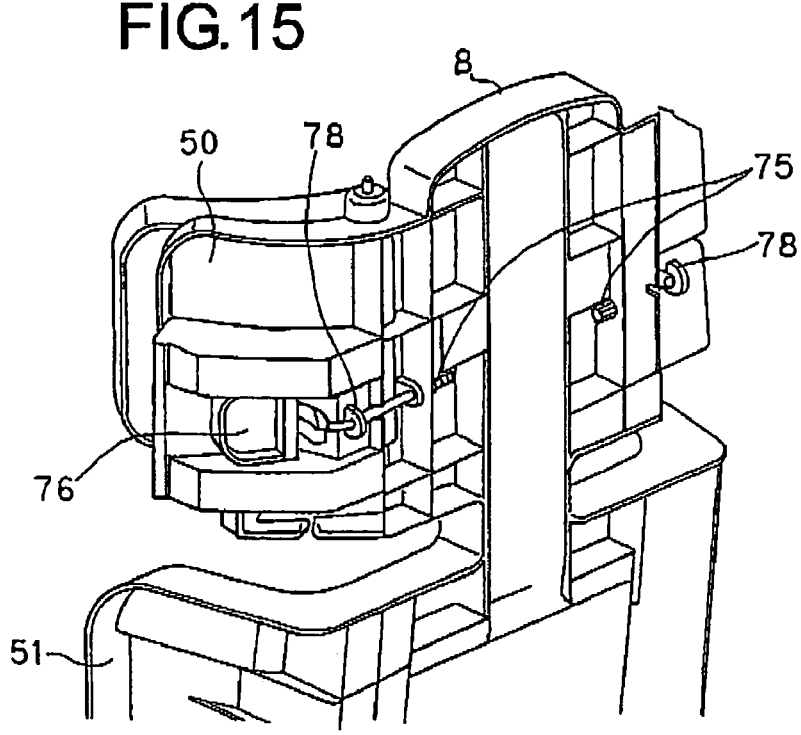
FIG. 15 is a view showing a tension spring for urging a connecting pin against the inside of the seat back.

In the meantime, as shown in FIG. 15, on the back side of each of the side supports 50 in the seat back portion 8, connecting pins 75 to be fitted into the pin inserting holes 68a formed on the slider 67 are secured so as to be slidable in the lateral direction. The seat back portion 8 is connected to the back frame 12 via the slider 67 so as to be rotatable about connecting pins 75 by inserting the connecting pins 75 into the pin inserting holes 68a (see FIG. 14) formed on the sliders 67 of the connecting portion 14.

Figure 16:
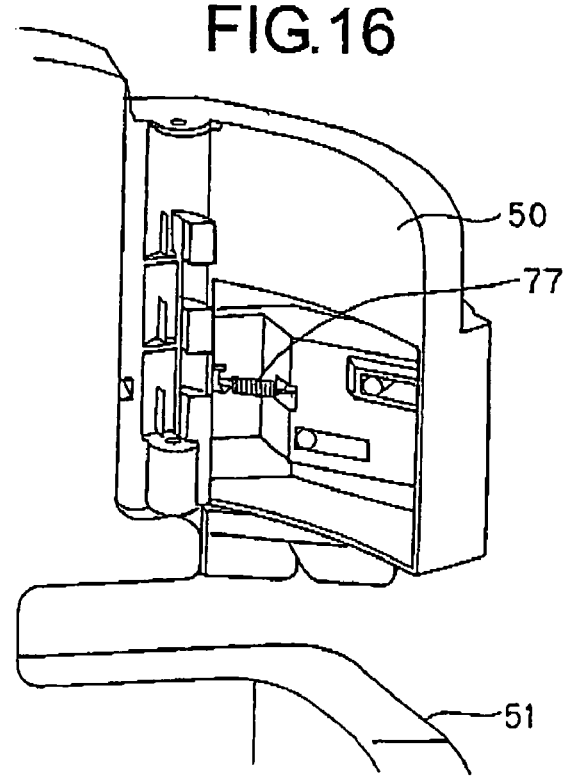
FIG. 16 is a view showing a spring for urging an operating lever at a standby position.

The ends of the connecting pins 75a reconnected to operating levers 76, respectively. In FIG. 15, only either one of the operating levers 76 is shown. The operating lever 76 is attached to the side support 50 in a manner slidable in the lateral direction. Furthermore, as shown in FIG. 16, the operating lever 76 is pulled inward of the side support 50 by a tension coil spring 77 serving as an urging device incorporated in the side support 50. When the operating lever 76 is pulled outward against the tensile force of the tension coil spring 77, the connecting pin 75 moves outward, and when the operating lever 76 is released, the connecting pin 75 is returned inward by the tensile force of the tension coil spring 77. With these operations, the connecting pin 75 can be fitted into or drawn from the pin inserting hole 68a formed at the slider 67. Incidentally, as shown in FIG. 15, the connecting pin 75 is inserted into a pin guide 78 whose periphery is rounded into an arcuate shape.

Figure 17:
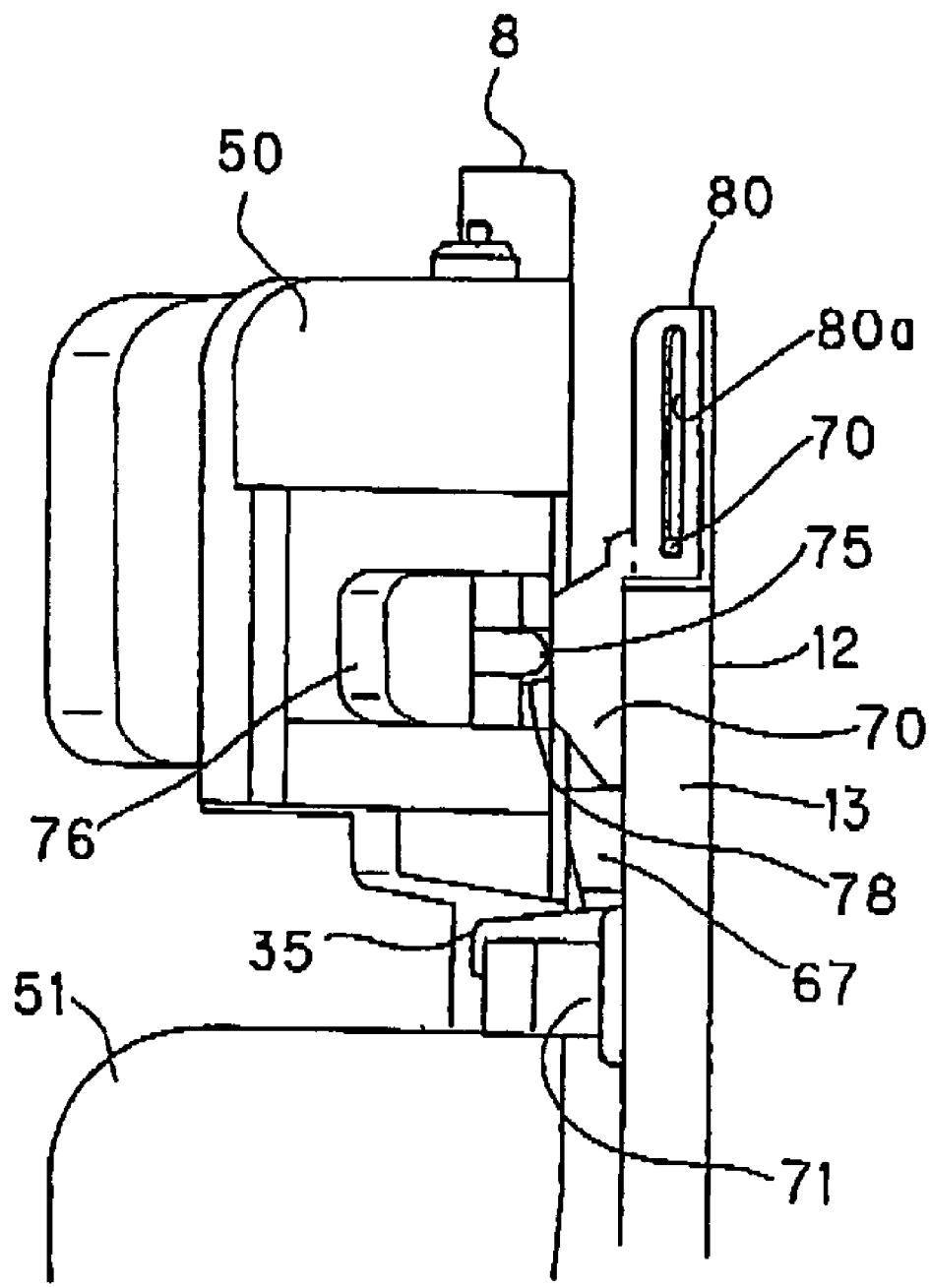
FIG. 17 is a view showing a state where the seat back is connected to a back frame via a connecting portion.

FIG. 17 shows a state where the seat back portion 8 is connected to the back frame 12 via the connecting portion 14. The pin guide 78 with respect to the connecting pin 75 is fitted into the receiving groove 69a (see FIG. 14) of the auxiliary supporter 69 disposed in the slider 67. Consequently, a rearward load to be exerted on the seat back portion 8 can be supported by the supporters 68 and 69. Moreover, a guide 80 is disposed at the upper end of the main frame 13, and further, a slot 80a extending in parallel in the lengthwise direction of the main frame 13 is formed at the guide 80. The movement direction of the slider 67 is restricted to the lengthwise direction of the main frame 13 by inserting the guide pin 70 of the slider 67 into the slot 80a.

According to the above-described configuration, the seat unit 3 can be attached to the base unit 2 by putting the seat cushion portion 6 onto the slider 5, engaging the cushion rotary shaft 57 with the bearing portion 42, engaging the arm 61 of the seat back portion 8 with the strut 7, and inserting the connecting pin 75 of the seat back portion a into the pin inserting hole 68a provided on the slider 67 on the back frame 12. In this state, the child is restrained in the seat unit 3 by using the restraining belt device 4, thereby achieving the child seat of the G1 class.

Additionally, in this usage mode, the inclination of the seat back portion 8 is varied by adjusting the position of the slider 5 in the longitudinal direction by the operation of the position adjusting lever 21, thereby achieving a desired reclining attitude. Incidentally, an expansion/contraction mechanism is incorporated in the seat back portion 8, the change can be absorbed by the expansion/contraction mechanism incorporated in the seat back portion 8 even if the distance between the strut 7 and the connecting pin 75 is changed by the length wise movement of the slider 5. Therefore, it is unnecessary to adjust the position of the slider 67 in the vertical direction. In contrast, the height of the headrest 49 can be adjusted according to the build of the child by vertically moving the slider 67.

Further, the seat unit 3 can be detached from the base unit 2 by lifting up the seat cushion portion 6, detaching the cushion rotary shaft 57 from the bearing portion 42, and drawing the connecting pin 75 in the seat back portion 8 from the pin inserting hole 68a, thereby achieving the child seats of the G2 and G3 classes for restraining the child by using only the seat unit 3 or the seat cushion portion 6 and the seat belt of the vehicle.

The present invention is not limited to the above-described embodiment, and therefore, it may be carried out in various modes. For example, the connecting structure between the slider 5 and the seat cushion portion 6, the connecting structure between the seat back portion 8 and the base unit 2, and the connecting structure between the seat cushion portion 6 and the seat back portion 8 are not limited to those described in the above-described embodiment, and therefore, they may be appropriately varied within a scope without obstructing the achievement of the object of the present invention. For example, the seat cushion portion 6 may not be liftably connected to the slider 5. The fore end of the seat cushion portion 6 may be rotatably connected to the slider 5. The number of belt guides 34 on the base is not limited to two, but it may be appropriately varied if it is necessary to hold the waist belt portion 105. The belt guide 34 may be continuously disposed over the entire width of the slider 5.

In the above-described embodiment, the seat cushion portion 6 and the seat back portion 8 in the seat unit 3 can be detached from each other, thereby coping with the child seat of the G3 class, in which only the seat cushion portion 6 is used. However, it is absolutely necessary to detach the seat cushion portion 6 and the seat back portion 8 from each other. The seat cushion portion 6 and the seat back portion 8 may be detachably attached to each other, thereby coping with only the child seats of the G1 and G2 classes the child seat according to the present invention is not limited to various usage modes for the classes in conformity with the above-described ECER44/03 system, and therefore, usage modes may be varied from the viewpoint of other standards or factors other than the standard.

In the child seat according to the present invention, it is not always necessary to fix the seat unit so as to press the seat unit against both of the seat cushion 101 and the seat back 102 on the seat, but the base unit may be configured such that the seat unit is fixed only onto the seat cushion 101. In such a case, the seat back in the seat unit may be supported by the lower portion of the seat back, and at the same time, the upper end of the seat back may be supported by the seat back of the seat. Here, in order to stably support the upper end of the seat back, it is desirable that the base unit should be configured so as to include a portion to be placed on the seat cushion 101 and a portion to be pressed against the seat back 102.

As described above, the child seat according to the present invention can be applied within the wide range including the use for the child who is too small to use the seat belt of the vehicle and the use for the child who is too small to use the special restraining belt device since it is possible to select the usage mode in which the seat unit is combined with the base unit, and then, the child sitting on the seat unit is restrained to the seat unit by the restraining belt device extending from the base unit, and the usage mode in which the seat unit detached from the base unit is placed on the seat of the vehicle, and then, the child sitting on the seat unit is restrained by the seat belt of the vehicle. Furthermore, the inclination of the seat back can be varied while not applying the unnatural inclination to the seat cushion by moving the seat cushion lengthwise even on a level on which the special restraining belt device is used, so that the child cannot be forced to take any unnatural sitting attitude, and further, the large shield or the like need not be disposed in front of the child. Moreover, since the seat unit is not configured in the shell structure in which the cushion and the seat back are integrated with each other, the sufficient cabin can be secured in the case of the usage of only the seat unit. As a result, the child seat according to the present invention is excellent in conformability for the child. Additionally, since the restraining belt device is fixed to the base unit, the restraining belt device is integrated with the base unit even when the base unit and the seat unit are detached from each other, thereby producing an advantage that the restraining belt device cannot be lost.

What is claimed is:

1. A child seat comprising:
    a base unit placed on a seat of a vehicle; and
    a seat unit placed on the base unit in a forward attitude with respect to the seat of the vehicle; wherein
    the base unit is provided with a base body to be fixed to the seat, a slider connected to the base body in a positionally adjustable manner in a longitudinal direction of the seat of the vehicle, and a restraining belt device for restraining a child sitting on the seat unit; and
    the seat unit is provided with a seat cushion portion integrally connected to the slider in a positionally adjustable and detachable manner, and a seat back portion connected to the rear end of the seat cushion portion in a manner turnable about an axis extending in a lateral direction of the seat and connected at the back side thereof to the base unit in a detachable manner.

2. The child seat according to claim 1, wherein the seat cushion portion and the seat back portion of the seat unit can be detached from each other.

3. The child seat according to claim 1, wherein a restraining belt guide for regulating a passing position of a seat belt of the vehicle is disposed on each of both sides in a width direction of the seat cushion portion.

4. The child seat according to claim 1, wherein the base body is provided with a fixing belt guide for stretching the seat belt of the vehicle along a predetermined path with respect to the base body, and a lock-off device for restraining the seat belt of the vehicle with respect to the base body.

5. The child seat according to claim 4, wherein a waist belt guide serving as the fixing belt guide for guiding a waist belt portion of the seat belt of the vehicle is located at a position to be covered with the seat cushion portion disposed on the slider.

6. The child seat according to claim 1, wherein the restraining belt device is provided with a shoulder belt and a crotch belt connected to the shoulder belt, one end of the crotch belt being fixed to the slider while the other end of the crotch belt being drawn forward of the seat cushion portion in a manner connectable to the shoulder belt.

7. The child seat according to claim 1, wherein the base body is provided with a bottom supporter disposed on the seat cushion of the seat of the vehicle and a back supporter extending upward from the rear end of the bottom supporter and abutting against the seat back of the seat of the vehicle, the slider is connected to the bottom supporter in a positionally adjustable manner in the longitudinal direction and the seat back portion is connected to the back supporter at the upper end on the back side.

8. The child seat according to claim 7, wherein the seat back portion is connected to the back supporter in a manner rotatable about an axis extending in a lateral direction of the seat.

9. A child seat comprising:
    a base unit adapted to be placed on a seat of a vehicle; and
    a seat unit adapted to be placed on said base unit,
    wherein said base unit includes a base body adapted to be fixed to the seat, a slider adjustably connected to said base body so as to be movable in a longitudinal direction of the seat, and a restraining belt device for restraining a person sitting on said seat unit, and
    wherein said seat unit includes a seat cushion portion detachably connected to the slider and movable with said slider longitudinally in the seat while maintaining a reclining angle of said seat cushion portion, and a seat back portion pivotally connected to a rear of said seat cushion portion about an axis extending in a lateral direction of the seat to vary a reclining angle of said seat back portion as said seat cushion portion moves longitudinally, said seat back portion being detachably connected at a back side thereof to the base unit.

10. The child seat according to claim 9, wherein said seat back portion is detachable from said seat cushion portion.

* * * * *